(12) United States Patent
Puffer et al.

(10) Patent No.: US 12,435,699 B1
(45) Date of Patent: Oct. 7, 2025

(54) PITCH MOTOR TROLLEY

(71) Applicant: The AES Corporation, Arlington, VA (US)

(72) Inventors: Daniel Puffer, Arcade, NY (US); Eric Slocum, Holland, NY (US); Bruce Juneau, Chazy, NY (US); David Laplant, Malone, NY (US); Martin Vincent, Chateaugay, NY (US)

(73) Assignee: The AES Corporation, Arlington, VA (US)

( * ) Notice: Subject to any disclaimer, the term of this patent is extended or adjusted under 35 U.S.C. 154(b) by 0 days.

(21) Appl. No.: 18/517,705

(22) Filed: Nov. 22, 2023

Related U.S. Application Data

(60) Provisional application No. 63/427,142, filed on Nov. 22, 2022.

(51) Int. Cl.
| | |
|---|---|
| *F03D 13/10* | (2016.01) |
| *B66C 7/02* | (2006.01) |
| *B66C 23/18* | (2006.01) |
| *B66C 23/20* | (2006.01) |

(52) U.S. Cl.
CPC .............. *F03D 13/122* (2023.08); *B66C 7/02* (2013.01); *B66C 23/185* (2013.01); *B66C 23/207* (2013.01); *F05B 2230/61* (2013.01); *F05B 2230/70* (2013.01)

(58) Field of Classification Search
CPC ... B66C 23/207; B66C 23/166; B66C 23/185; B66C 23/26; B66C 7/02; B66C 7/16; F03D 13/122; F05B 2230/61; F05B 2230/70
See application file for complete search history.

(56) References Cited

U.S. PATENT DOCUMENTS

| | | | | |
|---|---|---|---|---|
| 3,091,346 | A * | 5/1963 | Yawn | ...................... B66C 19/02 |
| | | | | 212/337 |
| 5,720,400 | A * | 2/1998 | Altizer, Sr. | ............. B66C 17/00 |
| | | | | 212/346 |
| 8,827,648 | B2 * | 9/2014 | Pedersen | ............... B66C 23/207 |
| | | | | 416/204 R |
| 9,120,652 | B2 * | 9/2015 | Munk-Hansen | ........ B66C 23/18 |

(Continued)

FOREIGN PATENT DOCUMENTS

| | | | | |
|---|---|---|---|---|
| EP | 3705445 A1 * | 9/2020 | ............. | B66C 19/00 |
| WO | WO-0234664 A1 * | 5/2002 | ............. | B66C 23/32 |
| WO | WO-2008069818 A1 * | 6/2008 | ............. | B66C 23/18 |

*Primary Examiner* — Anna M Momper
*Assistant Examiner* — Nathaniel L Adams
(74) *Attorney, Agent, or Firm* — Lempia Summerfield Katz LLC

(57) ABSTRACT

A pitch motor trolley and a method for operating a pitch motor trolley are disclosed. Wind turbines use pitch motors to change the pitch of its blade. At times, the pitch motor may need to be replaced, which can be difficult. The pitch motor trolley can move the pitch motor into/out of the hub, and includes a base structure, another structure connected to the base structure at one end and at another end to a track, and a trolley/hoist moving along the track. The base structure can be connected to a part of the nacelle for the pitch motor trolley to move the pitch motor through the nacelle into the hub (and vice versa). The base structure may also be connected to a part of the hub for the pitch motor trolley to move the pitch motor through a ceiling in the hub to the ground (and vice versa).

13 Claims, 14 Drawing Sheets

(56) References Cited

U.S. PATENT DOCUMENTS

| | | | |
|---|---|---|---|
| 2007/0273154 A1* | 11/2007 | Pedersen | B66C 23/207 |
| | | | 290/44 |
| 2010/0021278 A1* | 1/2010 | Stegemann | B66C 23/207 |
| | | | 414/629 |
| 2011/0211955 A1* | 9/2011 | Eriksen | B66C 23/207 |
| | | | 416/9 |
| 2015/0167342 A1* | 6/2015 | Montaner Fraguet | B66C 23/32 |
| | | | 52/745.18 |
| 2016/0281682 A1 | 9/2016 | Lee | |
| 2021/0108618 A1 | 4/2021 | Brody | |
| 2022/0153560 A1* | 5/2022 | Jayadeva | B66C 9/18 |

* cited by examiner

PITCH MOTOR TROLLEY

REFERENCE TO RELATED APPLICATION

The present application claims priority to U.S. Provisional Application No. 63/427,142, filed on Nov. 22, 2022, which is incorporated by reference herein in its entirety.

FIELD OF THE INVENTION

The present application relates generally to the field of wind turbines. Specifically, the disclosure relates to a pitch motor trolley that is used for one or both of removing or replacing a pitch motor in a wind turbine.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Wind turbines typically include various components, including a support tower (e.g., a mast), a nacelle (which may include any one, any combination, or all of the generator, gearbox, or drivetrain), a hub (which may include a pitch system such as a pitch motor), and blades. The pitch motor may be used to change the pitch of a blade of the wind turbine. At times, the pitch motor of the wind turbine may fail and thus may need to be replaced. However, it may be difficult to remove and replace the pitch motor within the hub of the wind turbine. For example, there are significant hazards in replacing the pitch motor, such as falling object hazards, lifting and strain injuries, and soft tissue injuries.

SUMMARY OF THE INVENTION

In one or some embodiments, a pitch motor trolley configured to remove or replace a pitch motor in a hub of a wind turbine is disclosed. The pitch motor trolley includes: a base structure configured to removably connect to a part within a nacelle or the hub of the wind turbine; a structure at one end integrated with or connected to the base structure; a track connected to an opposite end of the structure; a trolley configured to move along the track; and a hoist connected to the trolley and configured to raise and lower the pitch motor.

In one or some embodiments, a method for removing a pitch motor from or moving a pitch motor into a hub of a wind turbine. The method includes: connecting a base structure of a pitch motor trolley to a part of a hub or a nacelle of the wind turbine; using a structure connected to the base structure at one end of the structure, connecting a track to an opposite end of the structure, the track including a trolley that moves along the track; connecting the pitch motor to a hoist that is connected to the trolley; and using both the hoist and the trolley in order to move the pitch motor into or to remove the pitch motor from the hub of the wind turbine.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

FIG. 4I is a block diagram of one example of the hoist that includes a motor.

DETAILED DESCRIPTION OF THE INVENTION

Figure 1:
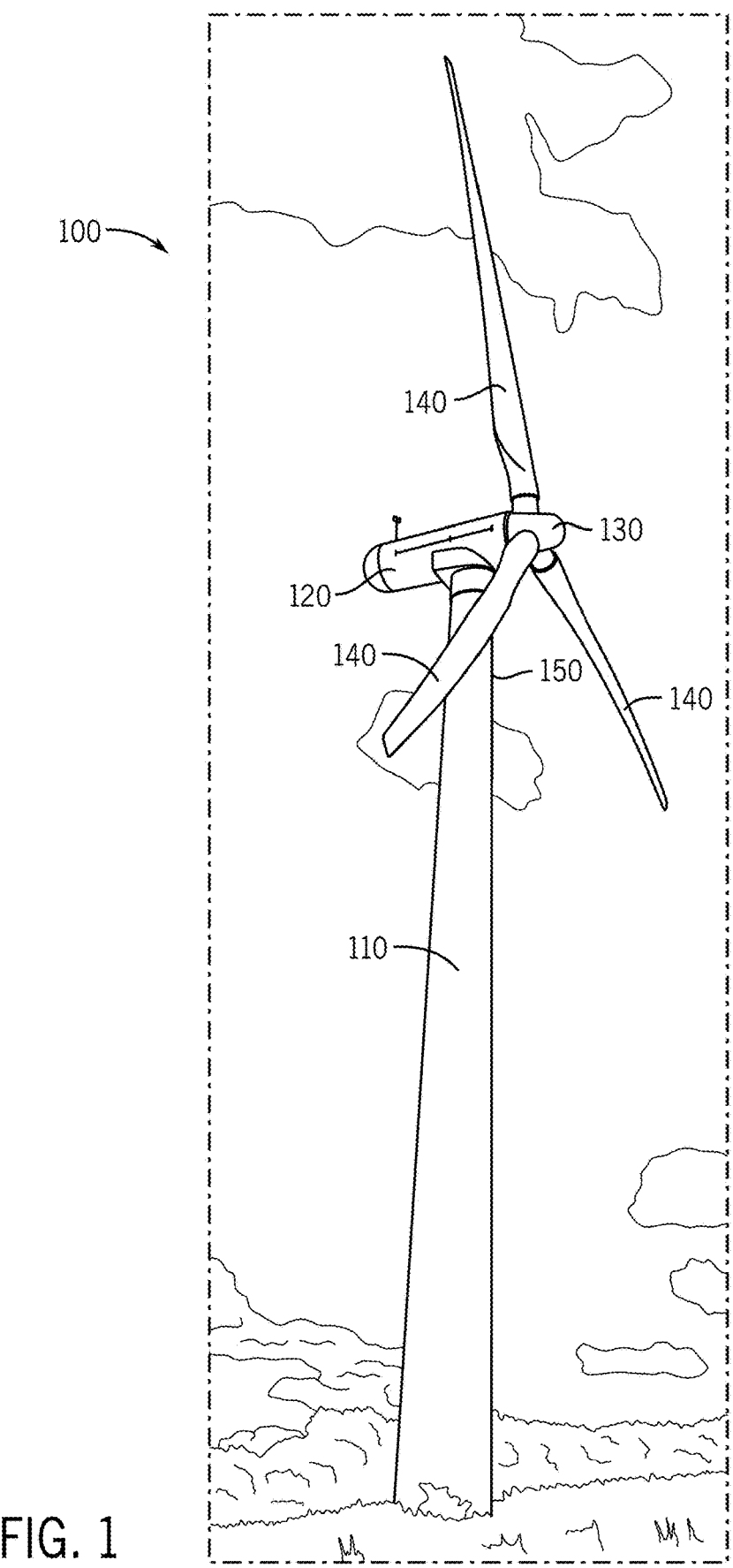
FIG. 1 is a representation of a wind turbine.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, pitch motors may need to be periodically replaced. However, it may be difficult to either remove the faulty pitch motor or to move the new pitch motor into the hub of the wind turbine (e.g., from a window or other opening of the wind turbine, such as a window in a ceiling of the hub of the wind turbine). One method to move or remove the pitch motor is to erect a crane that is outside of (and potentially connected to) the wind turbine in order to move the pitch motor into or out of the hub (which may be interchangeably termed the nose cone). However, erecting the crane outside of the wind turbine may be difficult.

Thus, in one or some embodiments, a pitch motor trolley is configured to connect to at least an internal part of the nacelle or the hub of the wind turbine. More particularly, the pitch motor trolley includes: a structure configured to reversibly connect to the at least an internal part of the nacelle or the hub of the wind turbine; a structure (such as a telescoping structure, a substantially vertical structure, etc.) at one end integrated with or connected to the base structure; a track connected, such as removably connected, to another end or an opposite end of the structure (e.g., the telescoping structure); and a hoist connected, such as removably connected, to the trolley and configured to raise and lower the pitch motor. In one embodiment, the structure may be removably affixed to a part of the nacelle, such as the main bearing of the nacelle, the bedframe of the nacelle, or the like, in order to anchor the pitch motor trolley. As discussed above, the structure may be a telescoping structure or a non-telescoping structure. In a separate embodiment, the structure may be removably affixed to a part of the hub, such as the hole cross brace of the hub, in order to anchor the pitch motor trolley. Again, the structure connected to the part of the hub may be a telescoping structure or a non-telescoping structure. In this way, the pitch motor trolley is configured to move the pitch motor between a place external to the wind turbine (e.g., a deck, such as a yaw deck, on the support tower of the wind turbine) and a place internal to the wind turbine (e.g., at least one of the nacelle or the hub) in a stable and safe manner.

Referring to the figures, FIG. 1 is a representation of a wind turbine 100. The wind turbine includes support tower 110 (alternatively termed the mast), the nacelle 120, the hub 130, the blades 140, and yaw deck 150. In one embodiment, the rotor includes part or all of the hub 130 and the blades 140. The nacelle 120 may include any one, any combination, or all of: the drive train; the yaw system; the service crane, the crane rail, the nacelle control panel, or the generator. Further, the drive train may include any one, any combination, or all of: the gearbox, the main shaft, or the main shaft bearing. The yaw system may include any one, any combination, or all of: the yaw bearing, the yaw motor, or the yaw break. The hub may include the pitch system and the hub housing. The pitch system may include any one, any combination, or all of: the pitch control box, the pitch bearing, the pitch motor, and the hub housing. As discussed above, the pitch motor may be used to alter the pitch of one or more of the blades of the wind turbine. Further, as discussed herein, the pitch motor trolley is configured to move the pitch motor into and/or out of the interior of the wind turbine (e.g., into or out of the hub or the nacelle). It is further contemplated that other parts within the turbine may likewise be moved into and/or out of the nacelle and/or the wind turbine.

As discussed in more detail below, the pitch trolley (or other similar structure) may be removably connected to a structure (e.g., a permanent structure) of one or both of the nacelle 120 or the hub 130, such as a base structure of the nacelle 120 and/or a base structure of the hub 130. In either instance, the base structure may be of sufficient rigidity in order to support the pitch motor trolley in moving the pitch motor into or out of the wind turbine.

In one or some embodiments, the pitch motor trolley is used to move the pitch motor from the ground into a part of the wind turbine (e.g., the hub) and vice versa. For example, the pitch motor trolley may be installed within a part of the wind turbine (e.g., the hub) and may be used to lift a faulty pitch motor vertically from within the hub 130 to outside of the wind turbine. After which, the pitch motor may be slid horizontally, and thereafter lowered down to the ground. The reverse may be performed to move the replacement pitch motor from the ground into the hub 130. This is illustrated, for example, in FIG. 3B, discussed further below.

Alternatively, the pitch motor trolley may be used to move the pitch motor to different parts of the wind turbine, such as one or both of: from one part within the wind turbine to another part within the wind turbine; and/or from one part within the wind turbine to another part on an external part of the wind turbine. As one example, the pitch motor trolley may be used to move the pitch motor from within the hub 130 to within the nacelle 120 and/or vice versa. As another example, the pitch motor trolley may be used to move the pitch motor from the yaw deck 150, discussed below, to within the nacelle 120 and/or vice versa. This is illustrated, for example, in FIG. 4E-F.

Figure 3A:
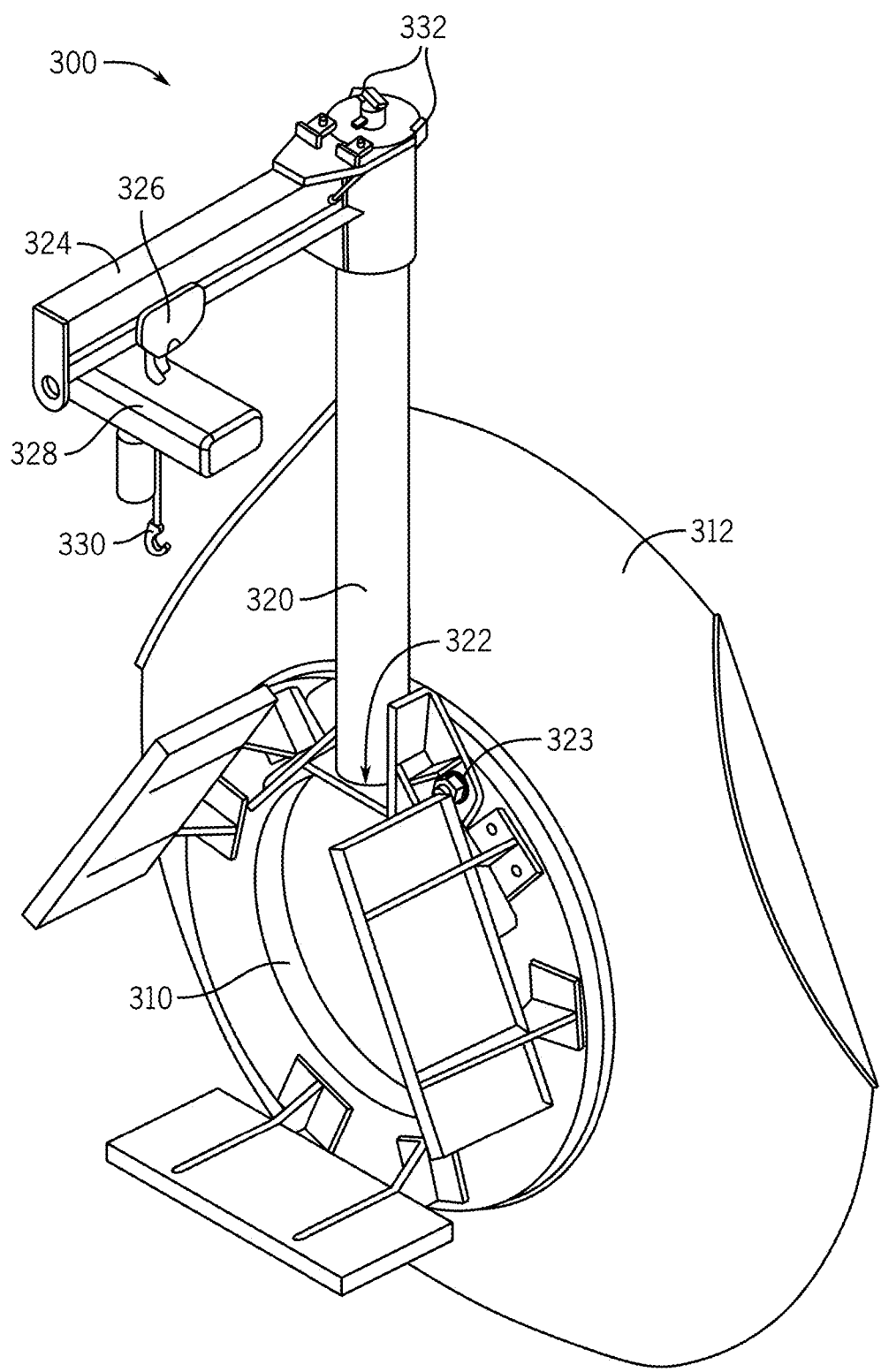
FIG. 3A is a representation of the hole cross brace within the hub of the wind turbine and a first example of the pitch motor trolley reversible connected thereto.
Figure 3B:
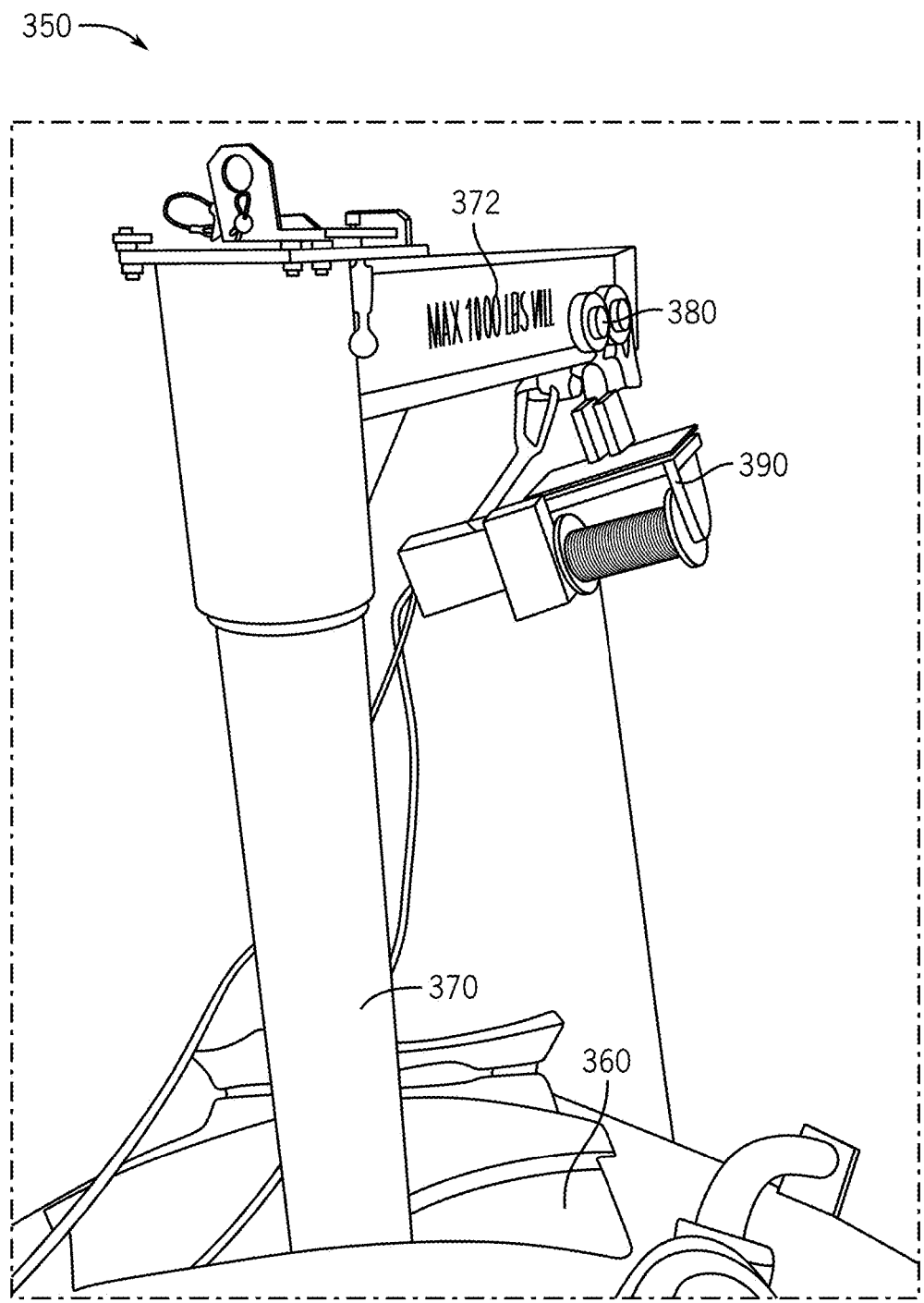
FIG. 3B is a representation of the first example of the pitch motor trolley external to the hub of the wind turbine.

In a specific embodiment, the pitch motor trolley may lift the faulty pitch motor out of an opening in the ceiling of the hub 130 so that the pitch motor is exterior to the wind turbine. Then, the pitch motor trolley may slide the faulty pitch motor across the trolley portion of the pitch motor trolley in order to position the pitch motor above an opening in the ceiling of the nacelle 120. After which, the pitch motor trolley may lower the pitch motor downward through the opening in the ceiling of the nacelle 120 to position the pitch motor within the nacelle 120. In one or some embodiments, the pitch motor trolley may continue the downward motion of the pitch motor, such as from within the nacelle 120 to outside of the nacelle 120. In particular, the pitch motor trolley may move the pitch motor through an opening in the floor of the nacelle 120 down to the yaw deck 150. In this regard, the yaw deck 150 may be used to raise a replacement pitch motor and/or lower a faulty pitch motor. Typically, the yaw deck 150 is below the nacelle 120, such as 10 feet (ft) below the nacelle 120. In this regard, in one or some embodiments, such as illustrated in FIGS. 4A-F (discussed below), the pitch motor trolley is configured to raise and/or lower the pitch motor at least 5 ft, at least 10 ft, at least 15 ft, at least 20 feet and/or no more than 20 ft, no more than 25 ft, no more than 30 ft, no more than 40 ft, or no more than 50 ft. Further, there may typically be an existing hoist previously installed in the support tower 110 of the turbine. In one instance, the existing hoist may raise a replacement pitch motor from the ground to the yaw deck 150. In turn, the pitch motor trolley, discussed further below, may then raise the replacement pitch motor from the yaw deck 150 into the wind turbine (e.g., into one or both of the nacelle 120 or the hub 130). Alternatively, when the yaw deck 150 is not used, the pitch motor trolley (such as illustrated in FIGS. 3A-B) is configured to raise and/or lower the pitch motor at least 30 ft, at least 40 ft, at least 50 ft, at least 60 ft, at least 70 ft, at least 80 ft, at least 90 ft, at least 100 ft, at least 110 ft, at least 120 ft, at least 130 ft, at least 140 ft, or at least 150 ft.

Figure 2:
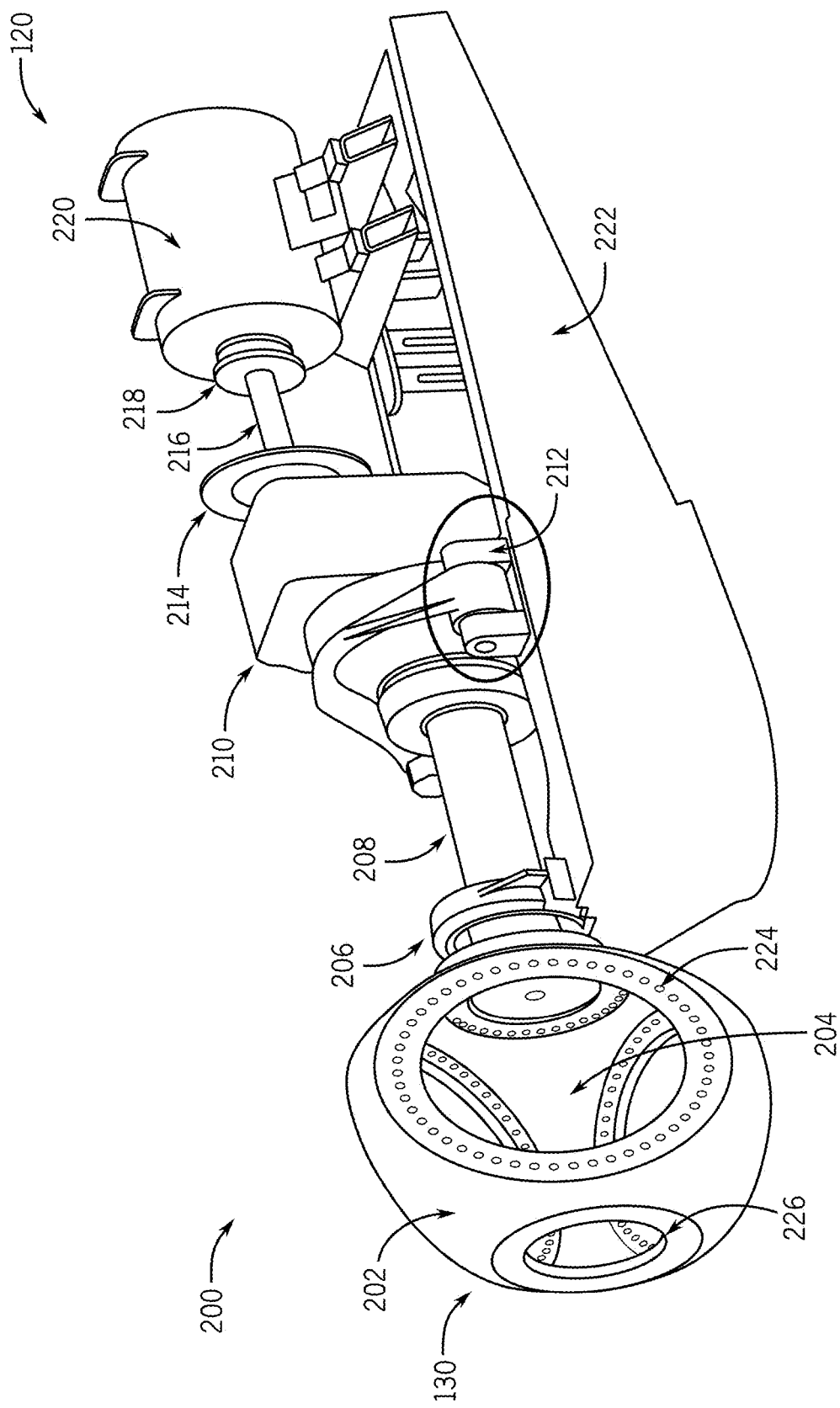
FIG. 2 is a representation of the internals of the nacelle and the hub of the wind turbine.

As discussed above, the nacelle 120 may include the generator and drivetrain and the hub 130 may include the pitch system such as the pitch motor. FIG. 2 is a more detailed representation 200 of the internals of the nacelle 120 and the hub 130 of the wind turbine 100. Specifically, FIG. 2 illustrates rotor hub that includes a hub casting 202 and a location 204 within hub casting 202 that houses installed pitch motor(s), which may be used to change the pitch of the blades 140 of the wind turbine 100. In one or some embodiments, the blades 140 may be attached to the hub casting 202 on one or more faces 224 of the hub casting 202. As shown in FIG. 2, hub casting 202 provides the structural support for the blades and may include a plurality of faces 224, such as three faces, at which to connect each of the respective blades. The hub casting 202 may further include the pitch system in order to modify the pitch of the blades. Finally, the hub casting 202 may include at least a part that is sufficiently rigid to support the pitch motor trolley. As one example, the pitch motor trolley may connect to the hole cross brace 226, discussed further below. Other places are contemplated.

FIG. 2 further illustrates different parts of the nacelle 120, such as the main bearing 206 (interchangeably termed the main shaft bearing), main shaft 208, gearbox 210, gearbox suspension 212, brake 214, high speed coupling 216, location of resistance temperature device (RTD), generator 220, and main frame/bedplate 222. In one or some embodiments, the main bearing 206, the main shaft 208, and the gearbox 210 comprise the drivetrain. Further, in one or some embodiments, the main shaft 208 may connect to at least a part of the hub 130 to the main bearing 206 and to the gearbox 210. RTD may comprise a device whose resistance changes with temperature and is an example of a temperature sensor.

Figure 4A:
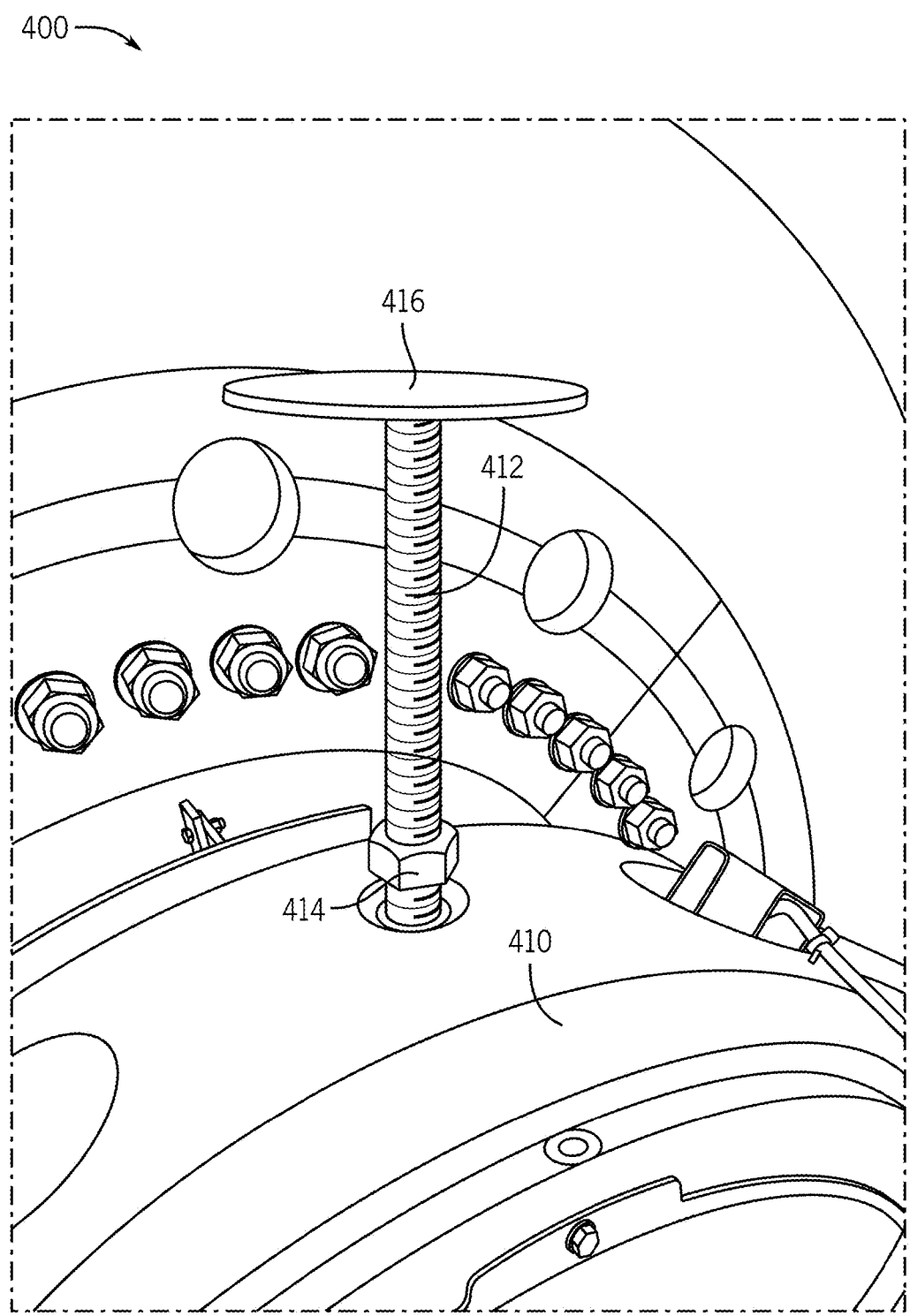
FIG. 4A is a representation of an internal part of the nacelle (e.g., the main bearing), a thread screw and a step.
Figure 4B:
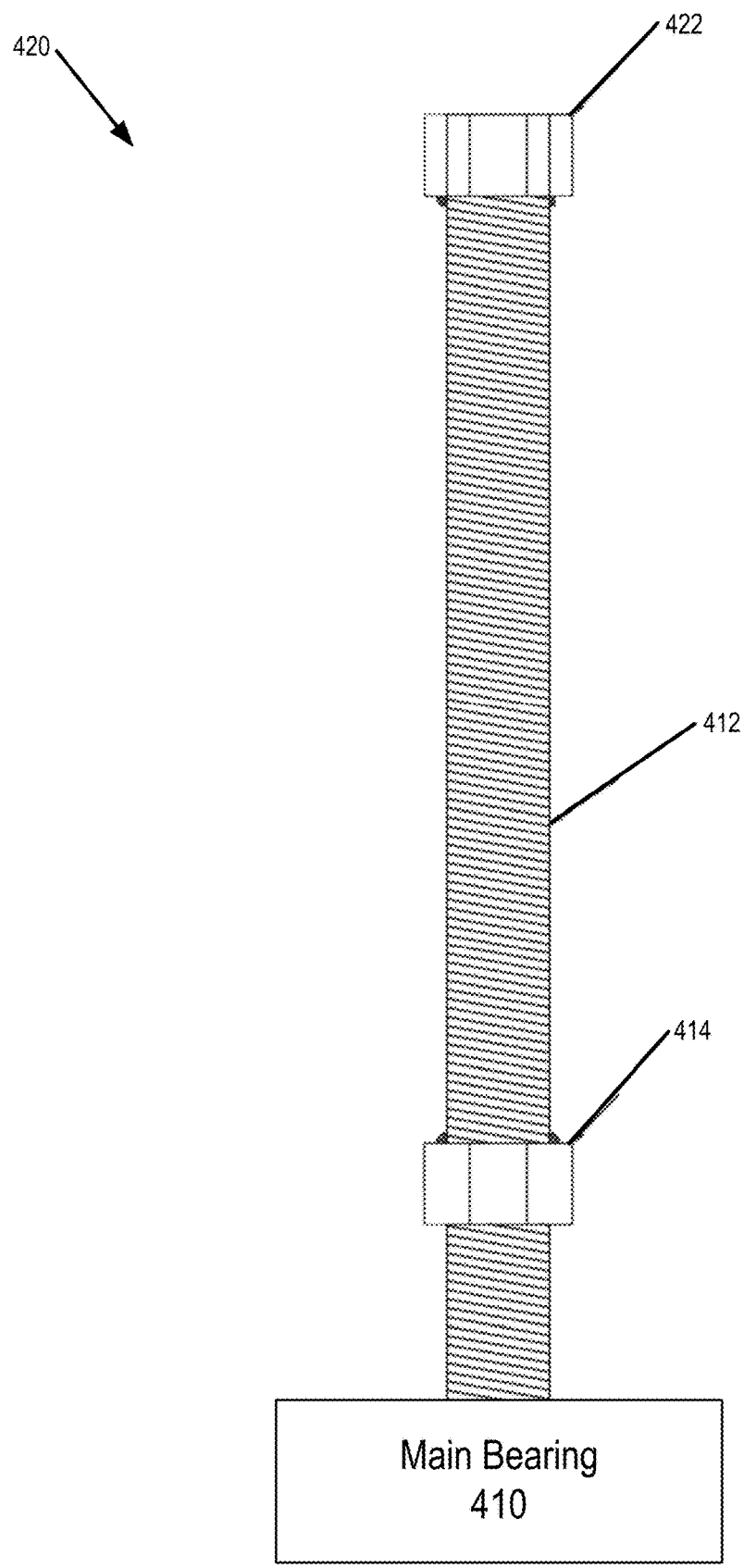
FIG. 4B is a representation of the threaded screw for the pitch jib hoist.

As discussed above, the pitch motor trolley may be connected to either a structure internal to the hub 130 (see FIGS. 3A-B) or a structure internal to the nacelle 120 (see FIGS. 4A-B). In either instance, the pitch motor trolley is removably connected to a structure (such as an existing structure, an unmovable structure, or a permanent structure) within the respective part of the wind turbine 100 (whether the hub 130 or the nacelle 120), with the structure providing sufficient structural support to the pitch motor trolley to hoist the pitch motor either into or out of the nacelle 120.

In particular, FIG. 3A is the first example of the pitch motor trolley connected to a part within the hub. Various parts within the hub are contemplated for connection to the pitch motor trolley. By way of example, FIG. 3A illustrates a representation 300 of the hole cross brace 310 within the hub of the wind turbine at which the pitch motor trolley may be connected. Generally speaking, the pitch motor trolley may include any one, any combination, or all of: a jib crane (or the like); a trolley (or the like) connected to the jib crane; and a hoist. As shown, the jib crane may include one or more pieces, such as vertical section 320 (or an at least partly vertical section) and horizontal section 324 (or an at least partly horizontal section). Various jib cranes are contemplated, such as an I-beam jib crane. Further, various materials are contemplated for the jib crane, such as aluminum and/or steel, for lighter weight yet sufficient structural rigidity. The jib crane is one example of an overhead lifting mechanism. Other overhead lifting mechanisms are contemplated.

Various types of trollies are contemplated, such as low headroom, normal headroom, or double girder trolley. Further, the trolley may be connected to a part of the jib mechanism, such as the horizontal section 324, which may comprise the I-beam portion of the jib crane.

The hoist 328 may be configured to lift and/or lower a load, such as the pitch motor, in a vertical plane. The hoist 328 may be connected to the trolley (see 326) and thus may move in a horizontal direction back and forth, such as across a bridge girder. In particular, the trolley may comprise the mechanism that moves the hoist 328 along the horizontal section 324 (e.g., the bridge girder) to position the hoist 328 at the desired locations (e.g., above the window in the hub to raise/lower the pitch motor out of the hub/into the hub, respectively; away from the hub to raise/lower the pitch motor from the yaw deck 150). The hoist 328 may further include a connection mechanism, such as hook 330, a clasp, or the like, by which to attach the pitch motor.

Various hoists 328 are contemplated. In one embodiment, hoist 328 may be manual in nature (e.g., not using an electric motor to move the pitch motor up/down) and may use chains. Alternatively, hoist 328 may be operated using an electric motor that provides the motive force to move the pitch motor upward/downward.

In practice, a part of the jib crane, such as vertical section 320 (which may comprise a lower boom), may be connected to at least a part of the hub casting 312, such as to hole cross brace 310, at 322. As shown in FIG. 3A, the vertical section 320 may be bolted to the hole cross brace such as by using one or more bolts 323. Other means of connection are contemplated. Other parts of the hub casting 312 at which to connect the vertical section 320 are contemplated. Further, as discussed above, the pitch motor trolley may include a telescoping structure or a non-telescoping structure. As shown in FIGS. 3A-B, the pitch motor trolley includes a non-telescoping structure (e.g., see vertical section 320). In this way, the pitch motor trolley, via the connection of the jib crane, may be secured to a structure within the hub. Other parts within the hub, which include the structural rigidity to support the pitch motor trolley connected thereto, are contemplated as well. Thus, the vertical section 320 may first be connected to the hole cross brace 310. After which, the horizontal section 324 (which may already have attached thereto the trolley 326 and the hoist 328) may be connected to the vertical section 320, such as via one or more bolts or fasteners 332.

FIG. 3B is a representation 350 of the first example of the pitch motor trolley external to the hub of the wind turbine. As shown, the vertical section 370 of the jib crane is positioned through a window 360 (or other type of opening in the ceiling) of the hub. Further, the horizontal section 372 may connect to the trolley 380, which in turn may be connected to the hoist 390. As discussed above, the trolley 380 may move along the horizontal section 372 (shown as an I-beam) to position the hoist 390 above the window 360 of the hub or away from the window 360 of the hub.

Further, as discussed above, the pitch motor trolley may be connected to a part of within the nacelle. This is illustrated in FIGS. 4A-H. As discussed above, various portions of the nacelle may provide the structural rigidity to attach the pitch motor trolley to. As one example, FIG. 4A is a representation 400 of an internal part of the nacelle (e.g., the main bearing 410), a thread screw 412 and a round flat surface 416. FIG. 4B is another representation 430 of the threaded screw 412 for the pitch jib hoist. In one or some embodiments, the main bearing 410 is an appropriate location at which to anchor the pitch motor trolley since the main bearing 410 may be located underneath the window in the nacelle. The main bearing 410 may further have sufficient structural rigidity to support the pitch motor trolley, and may have a threaded screw 412 and a nut 414 attached thereto. Further, the threaded screw 412 may have a flat surface 416 attached at one end. Another example of the flat surface is illustrated in FIG. 4G, discussed below. In one or some embodiments, the round flat surface 416 may be previously installed onto the threaded screw 412, and may be removed therefrom (as shown in FIG. 4B). After which, the base structure 432 may be placed onto the threaded screw 412.

Figure 4C:
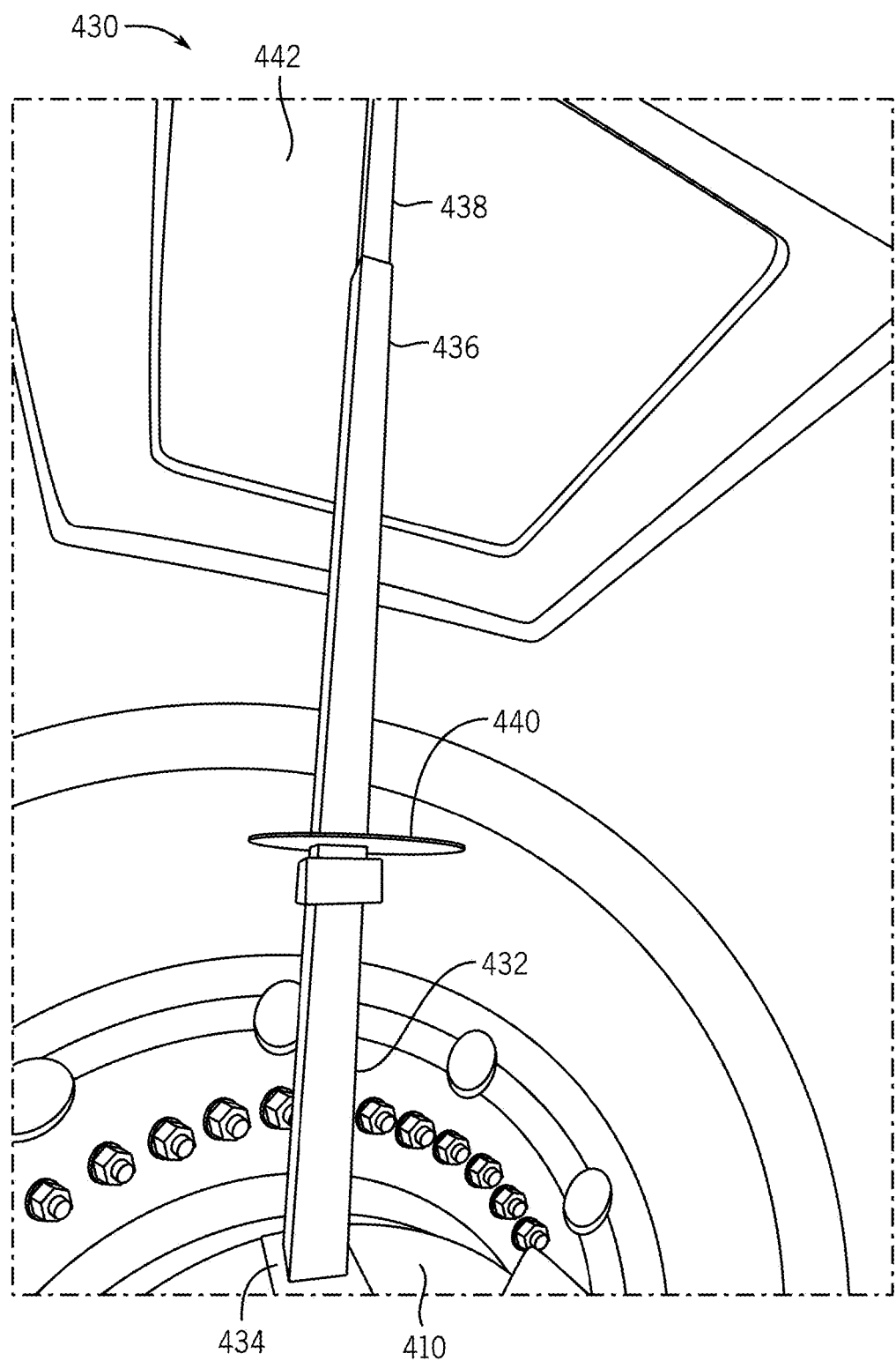
FIG. 4C is a representation of the structure reversibly connected to the main bearing in the nacelle and the telescoping structure extended through a window of the nacelle.
Figure 4D:
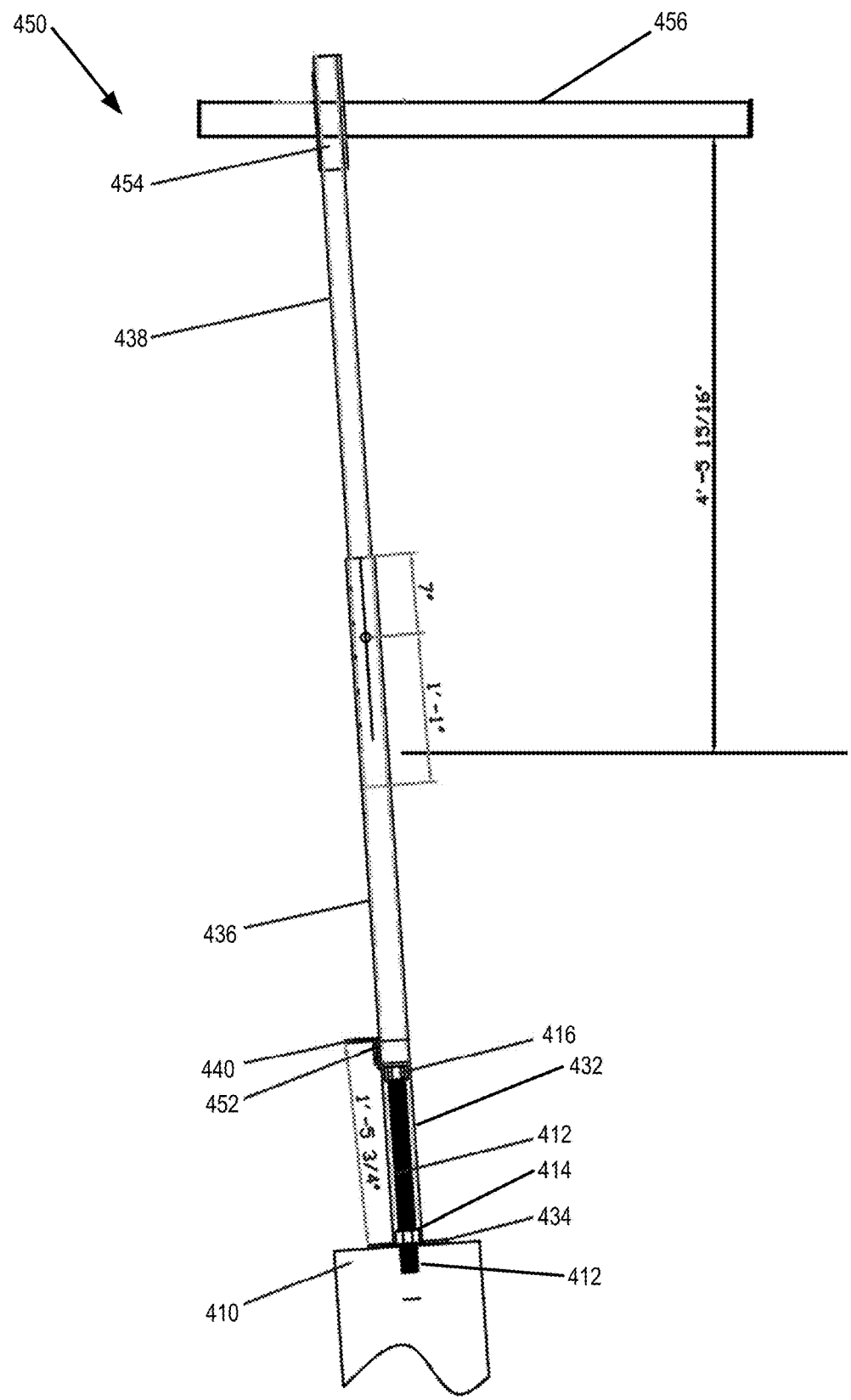
FIG. 4D is a representation of the nacelle jib structure, an example of the telescoping structure, reversibly connected to the main bearing in the nacelle and extending through the nacelle window.

FIG. 4C is a representation 430 of the structure reversibly connected to the main bearing 410 in the nacelle and the telescoping structure 436, 438 extended through a window 442 (or other type of opening in the ceiling) of the nacelle. The telescoping structure 436, 438 may comprise an at least partly vertical structure. In particular, in one embodiment, the telescoping structure 436, 438, when installed, is entirely vertical in orientation. Alternatively, the telescoping structure 436, 438, when installed, may be at least partly vertical and at least partly horizontal in orientation (e.g., the telescoping structure 436, 438, when installed an extended, has a vertical displacement greater than its horizontal displacement). FIG. 4D is another representation 450 of the nacelle jib structure, an example of the telescoping structure 436, 438, reversibly connected to the main bearing 410 in the nacelle and extending through the nacelle window. In one or some embodiments, various parts of the pitch motor trolley, such as any of the parts illustrated in FIGS. 4A-H, may be constructed of steel or aluminum.

Figure 4E:
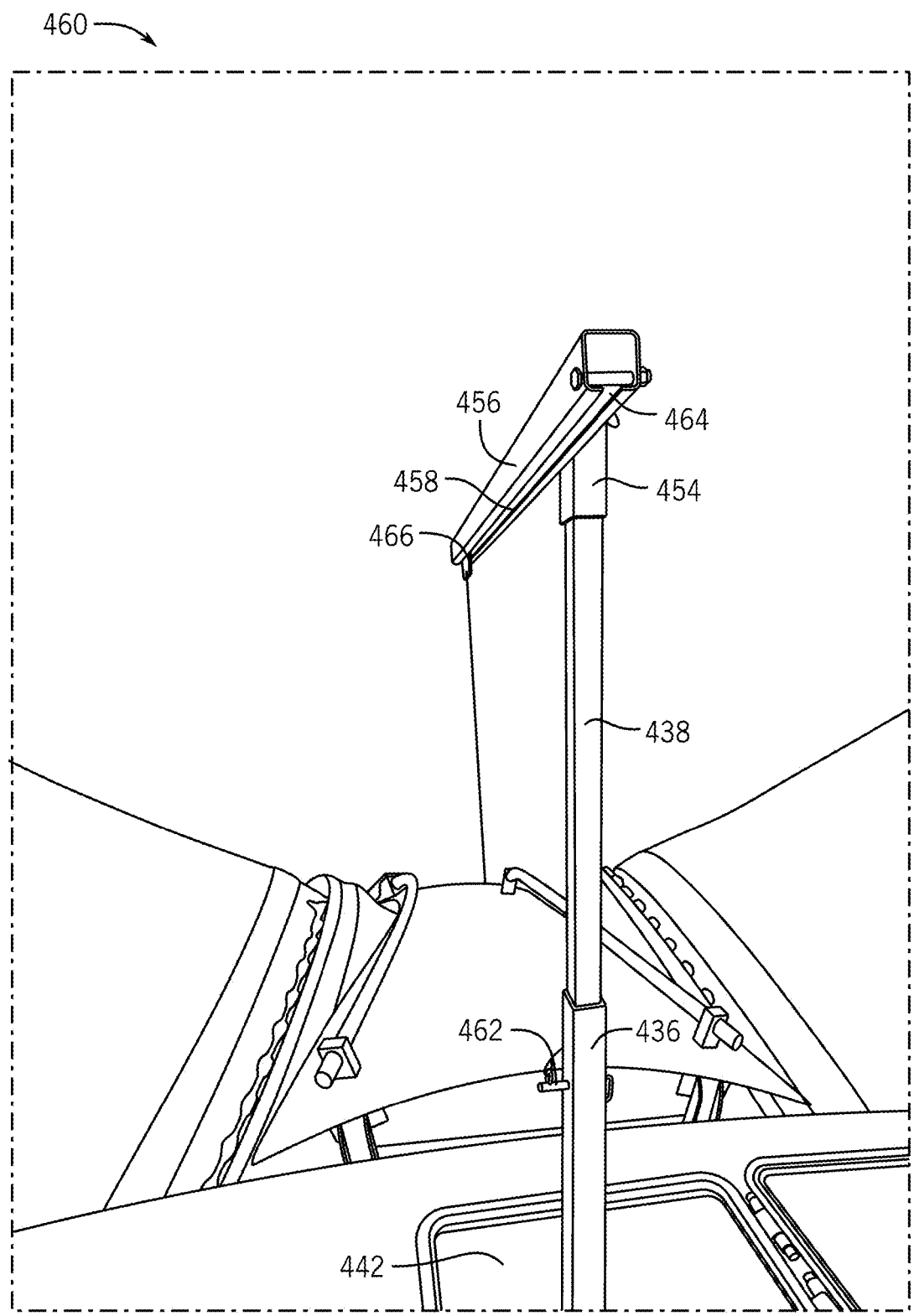
FIG. 4E is a representation of the second example of the pitch motor trolley with the track external to the nacelle of the wind turbine.

FIG. 4E is a representation 460 of the pitch motor trolley with the track external to the nacelle of the wind turbine. In one or some embodiments, the nacelle jib structure includes a base structure 432 and the telescoping structure 436, 438. In a particular embodiment, the base structure 432 and the telescoping structure 436, 438 are separate but connected. Alternatively, the base structure 432 is an extension of the telescoping structure 436, 438.

In one or some embodiments, the base structure 432 may be placed over the threaded screw 412, in effect acting as a sheath around the threaded screw 412. This is illustrated in the cross-section shown in FIG. 4D. In such an embodiment, the base structure 432 is not attached directly to the threaded screw 412. Rather, the base structure is effectively pushed onto and held in place for limited lateral movement (see nuts 414, 422 against base structure 432). As shown, the base structure 432 includes a base 434 that sits on the main bearing 410. In one embodiment, when placing the base structure 432 onto the threaded screw 412, the telescoping structure 436, 438 is attached to the base structure 432, but is not extended. Only after placing the base structure 432 onto the threaded screw 412 is the telescoping structure 436, 438 extended, such as illustrated in FIG. 4C. Alternatively, the base structure 432 alone (without the telescoping structure 436, 438) is placed on the threaded screw 412. After which, the telescoping structure 436, 438 may be attached to the base structure 432 and extended.

As shown in FIGS. 4C-D, flat surface 440 is connected to one or both of base structure 432 or telescoping structure 436, 438. Flat surface 440 may be attached to the threaded screw 412 in one of several ways, such as directly or indirectly. As one example, the threaded screw 412 may have a nut 422 at a top end (shown in FIG. 4B), with the flat surface 440 being attached to one or both of the threaded screw 412 or nut 422. In particular, the flat surface 440 may include a suitable recess on its underside in order to push the flat surface 440 onto the nut 422, thereby attaching as a form fit. Alternatively, the flat surface 440 may be attached to a device that in turn is attached (or in contact) with the threaded screw 412. For example, the flat surface 440 may be connected (e.g., slid into as a form fit or attached thereto) to a sheathe or other type of device that slides downward onto the threaded screw 412 or to a telescoping structure, as discussed with regard to FIGS. 4C-D and 4G.

Thus, in one embodiment, flat surface 440 may comprise a step upon which an operator may stand, and may be attached after configuration of one or both of base structure 432 or telescoping structure 436, 438. For example, the flat surface 440 may include an inset (see inset 482 in FIG. 4G, discussed further below), shaped to mate with the outer surface of telescoping structure 436 so that the flat surface 440 may be inserted and secured via form fit. Flat surface 440 may include vertical portion 452, which may rest against one or both of base structure 432 or telescoping structure 436, 438 to provide stability to flat surface 440 when it is used as a step on which a person may stand. FIG. 4D further illustrates connector 454 that connects telescoping structure 438 to horizontal section 456, which includes a track on its underside (see 458 in FIGS. 4E, 4F and 4H).

Figure 4F:
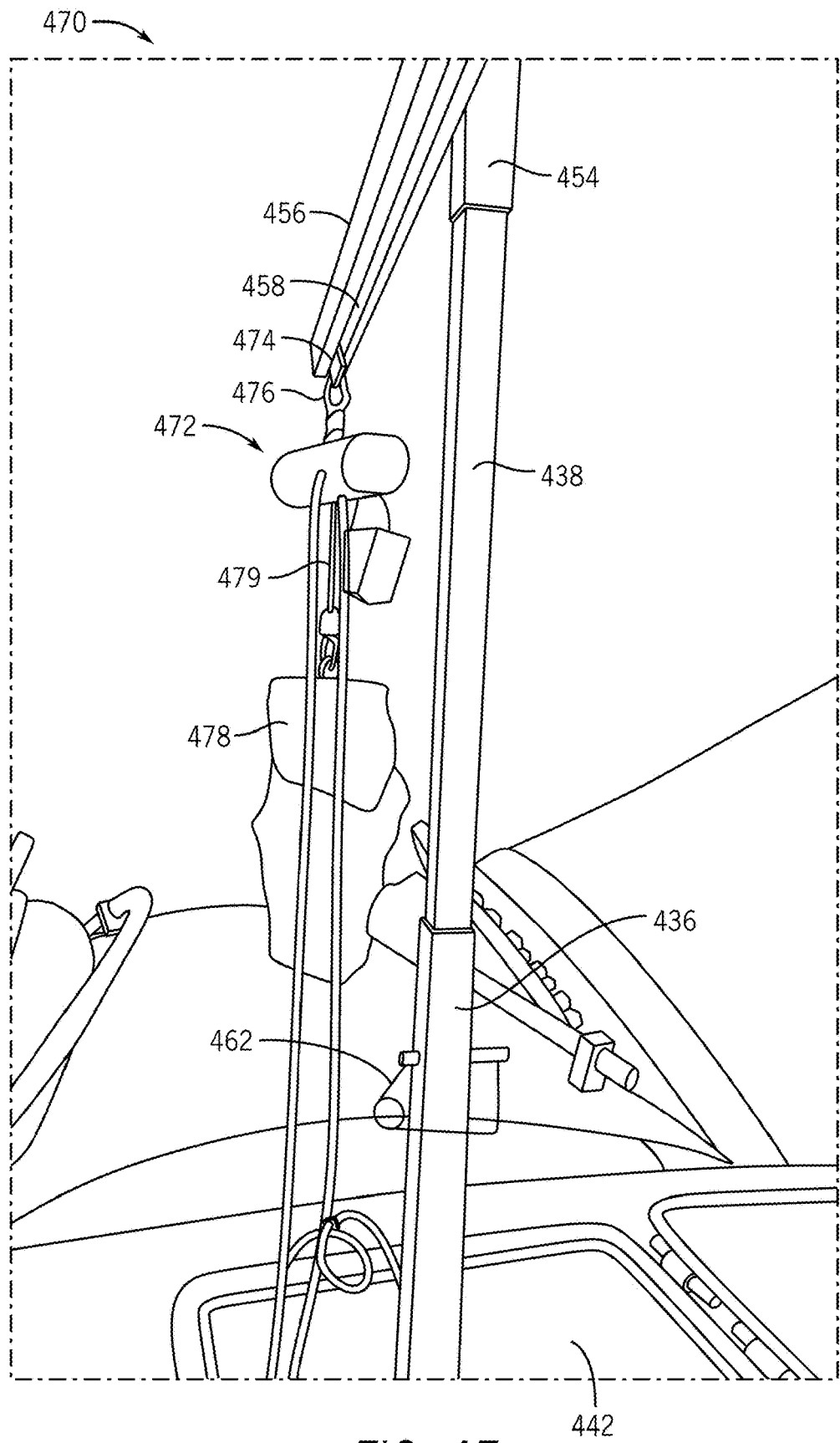
FIG. 4F is a representation of the second example of the pitch motor trolley with the track and the hoist external to the nacelle of the wind turbine.
Figure 4G:
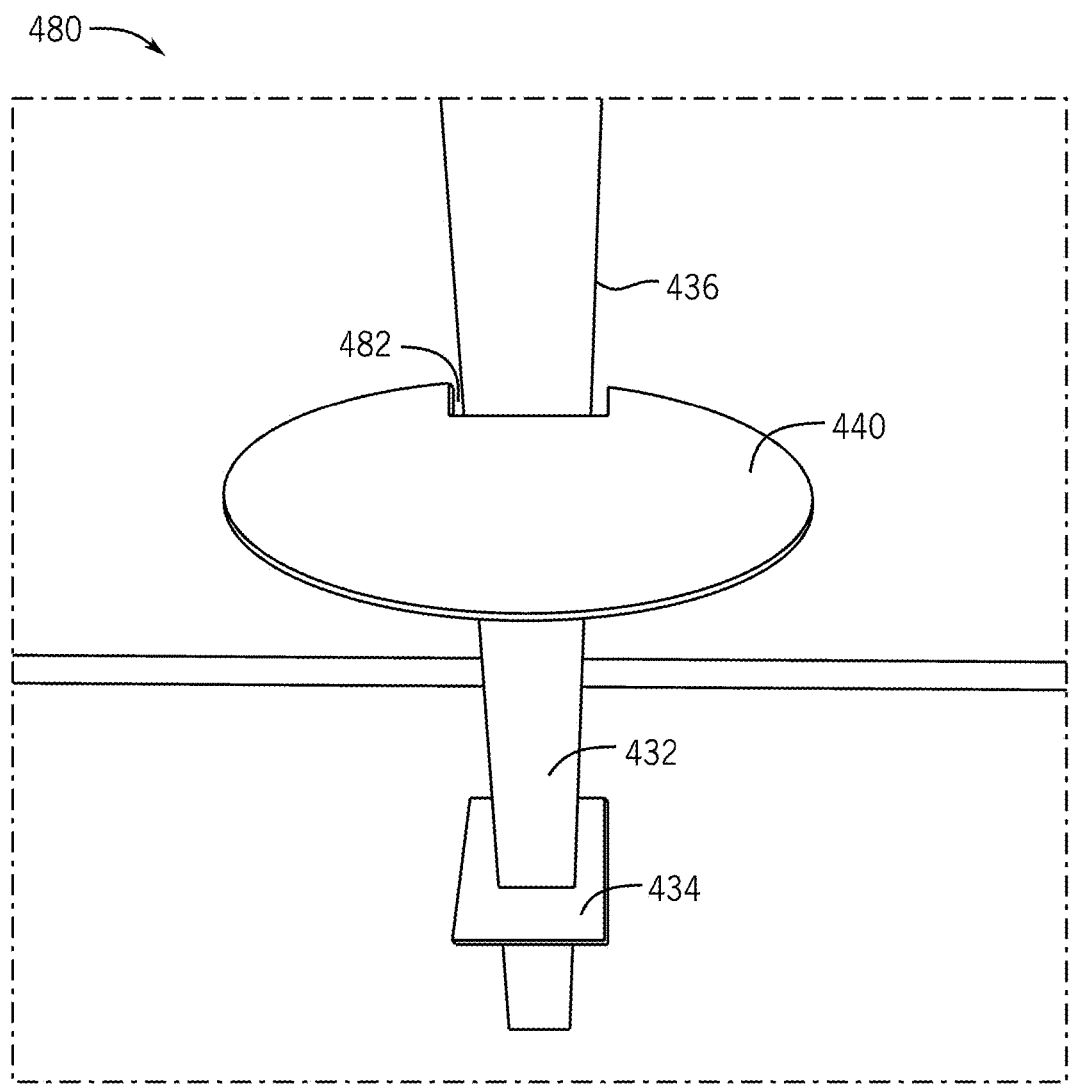
FIG. 4G is a representation of the step of the pitch motor trolley.

Referring back to FIG. 4E, the representation 460 illustrates the telescoping structure 436, 438 extended, with one or more pins (such as pin 462) inserted to maintain the extension of the telescoping structure 436, 438. The trolley 474 is illustrated in the representation 470 in FIG. 4F, whereby the trolley 474 is inserted into track 458 of horizontal section 456. Trolley 474 may include a clasp 476, hook or the like, which may be used to connect hoist 472 to trolley 474. As discussed above, in one embodiment, the hoist is manually operated, without a motor included therein. Alternatively, the hoist includes a mechanical motor therein within the hoist, such as illustrated in FIG. 4I, discussed below. As shown in FIG. 4F, the hoist 472 is carrying a pitch motor 478, which is encased in a protective layer, via one or more chains 479, wires, or the like.

In practice, the positioning of the track 458 is such that one part of the track, when installed, may be positioned above the opening in the ceiling of the nacelle (such as window 442) and a separate part of the track, when installed, may be positioned above the opening in the ceiling of the hub (such as window 360). This is illustrated, for example, in FIG. 4E in which section 464 of the track 458 is positioned above window 442 and section 466 on an opposite end of the track 458 is positioned over the window in the hub (not shown in FIG. 4E). In this way, using the combination of the hoist 472, trolley 474, and track 458, the pitch motor may be lifted from the hub to the nacelle and vice-versa.

FIG. 4G is a representation 480 of the flat surface 440 of the pitch motor trolley. As shown, the flat surface 440 may include an inset 482, which may mate with or may be in contact with one or more sides (such as at least three sides) of telescoping structure 436.

Figure 4H:
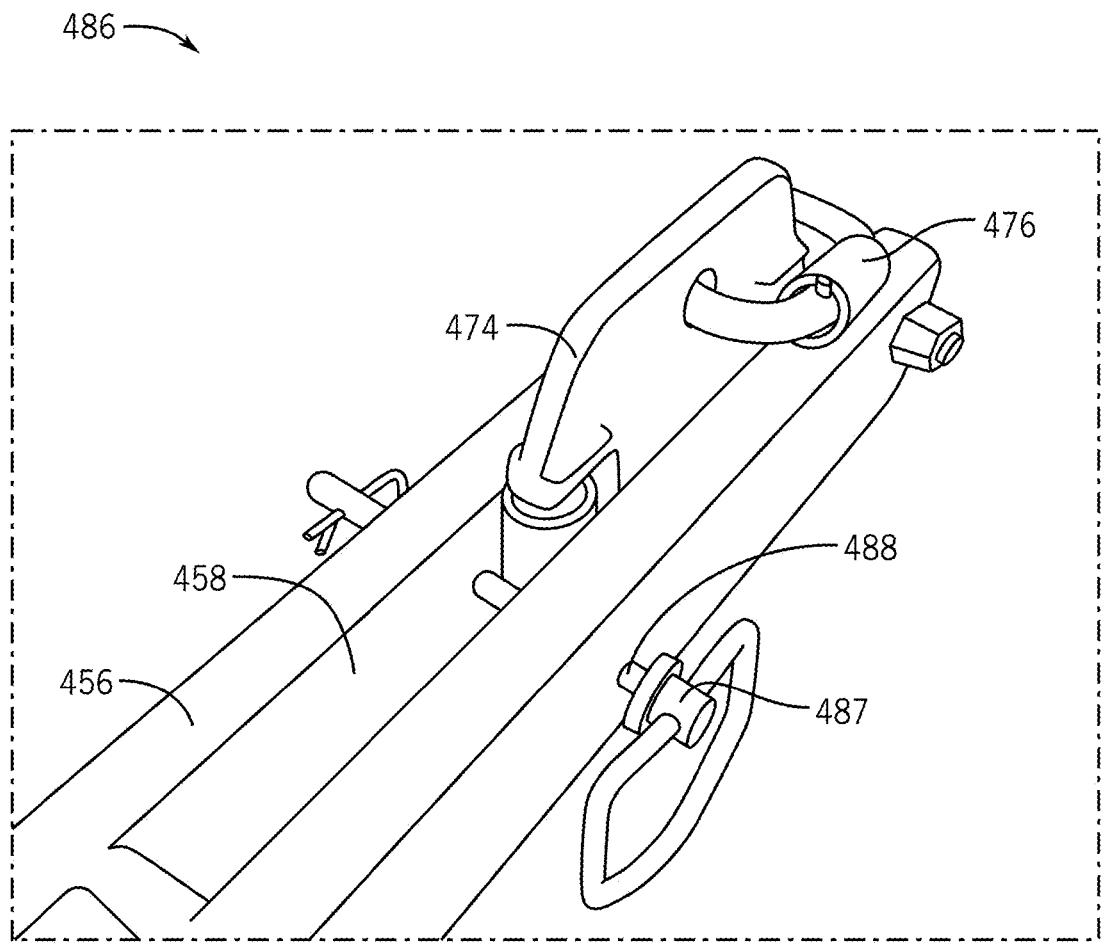
FIG. 4H is a representation of the underside of the track in which the trolley may move.
Figure 41:
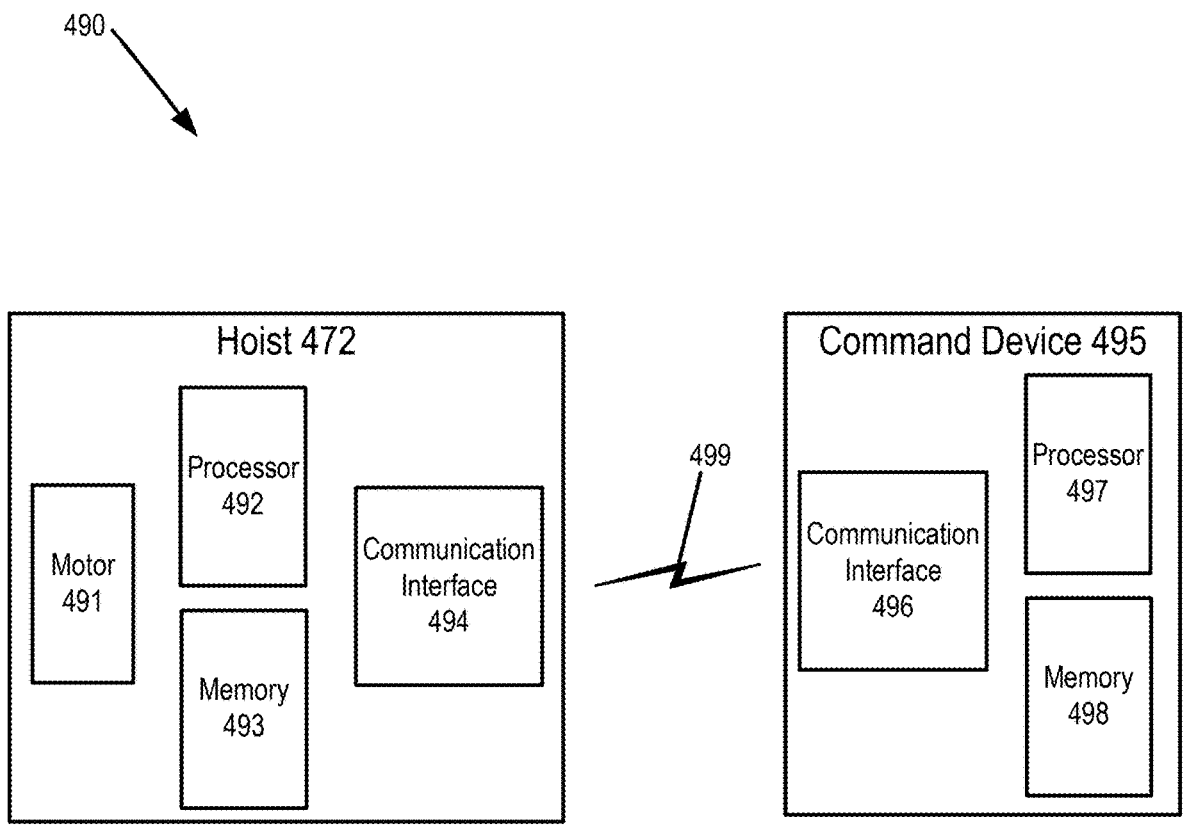

FIG. 4H is a representation 486 of the underside of the track 458 of the horizontal section 456 in which the trolley 474 may move. In one or some embodiments, the trolley 474 may be secured via a pin 487 that may be inserted through a hole 488 in the horizontal section 456. In this way, the movement of the trolley 474 is restricted and may not move along track 458, being held at one end of the horizontal section 456.

FIG. 4I is a block diagram 490 of one example of the hoist 472. As shown, hoist 472 may include a motor 491, computational functionality (e.g., controller 492 and memory 493), and a communication interface 494 to receive commands to control the motor 491 (e.g., a command to turn the motor on or off; a command to control the motor to lift the load; a command to control the motor to lower the load; etc.). Various types of computing functionality are contemplated, such as at least one processor 492 (which may comprise a microprocessor, controller, PLA, or the like) and at least one memory 493. The memory 493 may comprise any type of storage device (e.g., any type of memory). Though the processor 492 and the memory 493 are depicted as separate elements, they may be part of a single machine, which includes a microprocessor (or other type of controller) and a memory. Alternatively, the processor 492 may rely on memory 493 for all of its memory needs.

The processor 492 and memory 493 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. Further, the functionality discussed herein, such as controlling the motor, may be performed by the computing functionality.

FIG. 4I further illustrates command device 495, which may include computational functionality (e.g., processor 497 and memory 498), and a communication interface 496 to receive commands to control the motor 491. Processor 497 and memory 498 may be the same or similar to processor 492 and memory 493 described above. In one or some embodiments, command device 495 may send commands, such as via a wireless signal 499, to the communication interface 494 in order to control motor 491. Thus, in one embodiment, the hoist 472 operates via wireless communication. Various wireless communication protocols are contemplated. Alternatively, or in addition, the hoist 472 operates via wired communication. In response to receiving a command, the motor may act accordingly (e.g., turn on or off, raise or lower the pitch motor).

Figure 5:
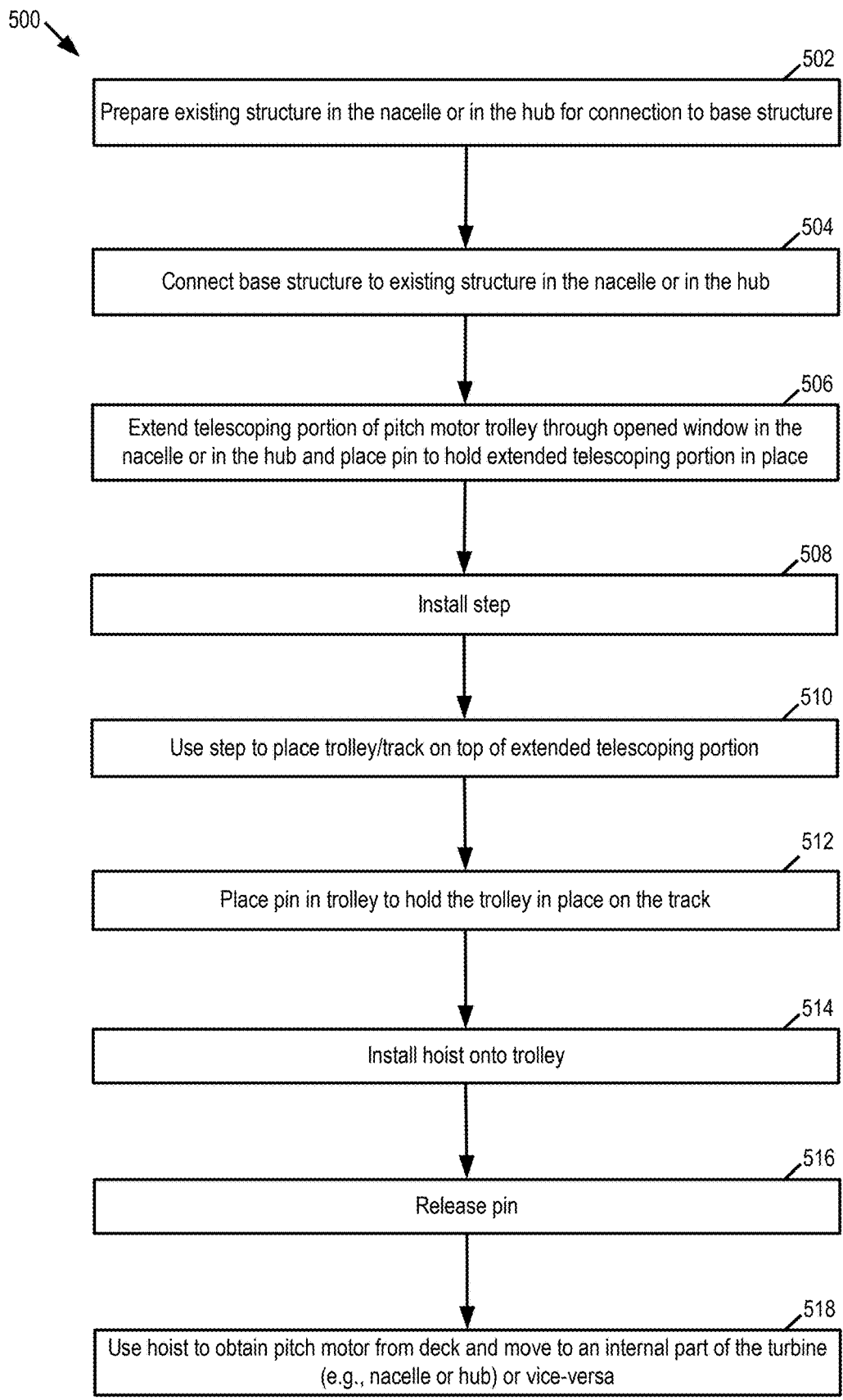
FIG. 5 is a flow diagram for configuring the pitch motor trolley and moving a pitch motor from or to the hub of the wind turbine.

FIG. 5 is a flow diagram 500 for configuring the pitch motor trolley and moving a pitch motor from or to the hub of the wind turbine. At 502, the existing structure (e.g., the main bearing 410) in the nacelle or in the hub may be prepared for connection to the base structure of the pitch motor trolley (e.g., base structure 432). For example, the threaded screw 412 may be attached to the base structure 432. Alternatively, the existing structure may be configured upon construction to be prepared for connection to the base structure.

At 504, the base structure is connected to the existing structure in the nacelle or in the hub. For example, the base structure may be connected directly or indirectly to the existing structure. In particular, in one embodiment, the base structure 432 may be connected to the main bearing 410 via a form fit with the threaded screw 412 (which is in turn connected to the main bearing). Alternatively, the base structure 432 may be connected directly to the main bearing.

In one embodiment, after connecting the base structure to the existing structure, the telescoping portion (alternatively termed telescoping structure), which may be un-extended or extended, may be connected to the base structure. Alternatively, the telescoping portion (e.g., telescoping structure 436, 438, which may be un-extended, may be connected to the base structure 432 prior to attaching base structure 432 to main bearing 410. In either instance, at 506, the telescoping portion of pitch motor trolley is extended through opened window in the nacelle or in the hub and a pin is placed to hold the extended telescoping portion in place. Optionally, at 508, the step, or other type of surface of sufficient rigidity to bear the weight of the operator standing thereon, may be installed, such as illustrated in FIG. 4C, D, or G. As discussed above, the step or other type of surface may be connected to or in contact with the base structure and/or the telescoping structure.

At 510, the trolley/track may be placed on the extended telescoping portion. At 512, the pin may be placed in the trolley to hold the trolley in place on the track. As one example, the operator may step on the step to place the trolley/track on top of the extended telescoping portion. In one embodiment, prior to placing the trolley/track on top of the extended telescoping portion, the pin 487 may be inserted into horizontal section 456 to hold trolley 474 in place, such as illustrated in FIG. 4H. After which, the trolley/track may be installed onto the extended telescoping portion. Alternatively, the pin 487 may be inserted into horizontal section 456 to hold trolley 474 in place after placement of the trolley/track on top of the extended telescoping portion.

At 514, the hoist may be installed onto the trolley. As discussed above, the hoist may be connected to the trolley via a clasp (such as clasp 476), hook, or the like. In one embodiment, the hoist is connected to the trolley after the trolley/track is installed onto the extended telescoping portion. Alternatively, the hoist may be connected to the trolley prior to connecting the trolley/track onto the extended telescoping portion.

After which, at 516, the pin (e.g., pin 487) may be released so that the trolley/hoist may move along the track. Finally, at 518, the hoist may be used to move the pitch motor from the deck to an internal part of the wind turbine (e.g., into the nacelle and/or the hub) and vice versa. Thus, in practice, when the operator is lifting the pitch motor from inside the nacelle, the operator may slide the trolley toward one end (e.g., so that the trolley is directly above the overhead window). Then, the chain from the hoist may be lowered to within the nacelle. The hook on the end of the chain may then be attached to the malfunctioning pitch motor. After which, the operator may hoist the malfunctioning pitch motor through the overhead window. In one or some embodiments, one person may guide the malfunctioning pitch motor as a second person works the hoist to lift the malfunctioning pitch motor out of the nacelle. Alternatively, in the event that the pitch motor trolley has its own motor in order to operate the hoist (e.g., move the pitch motor upward/downward), a single person may operate the motor and guide the malfunctioning pitch motor as it is lifted upward. After the malfunctioning pitch motor is lifted out of the nacelle, the trolley may then move the malfunctioning pitch motor to the opposite side. After which, the malfunctioning pitch motor may be lowered using the hoist to the yaw deck. At the yaw deck, the operator may unhook the malfunctioning pitch motor from the hoist. The reverse may be performed when moving the new pitch motor from the yaw deck and when lowering the new pitch motor into the nacelle.

Thus, in one or some embodiments, the pitch motor trolley may be designed as lightweight, compact when disassembled, and easily assemble. As discussed above, the pitch motor trolley may be mounted to an existing structure within the wind turbine, such as the main bearing inside the turbine, so that the existing wind turbine needs no modification to install the pitch motor trolley thereon, thereby making the pitch motor trolley relatively inexpensive and much quicker to install. Further, the pitch motor trolley is sufficiently supported by the existing internal structure within the turbine in order to move the pitch motor, which may be quite heavy (e.g., at least 175 lbs.) and may be shaped awkwardly. The pitch motor trolley may likewise be adapted to various different turbine designs using an existing structure, such as by using the main bearing with a large tapped hole in the housing.

Similarly, the pitch motor trolley may be easily disassembled, easily transported to within the wind turbine (e.g., within the nacelle or the hub). In addition, the various parts of the pitch motor trolley may conform to any one, any combination, or all of: no greater than 25 lbs.; no longer than 6 ft; and transported up the tower in a single lift bag. Further, the pitch motor trolley may be set up in less than 30 minutes. Finally, in operation, the pitch motor trolley requires no reaching or awkward lifts from the hub hatch and enables to operator to maintain positive control of the pitch motor through the entire transition (e.g., moving the pitch motor from the hub and/or nacelle to the yaw deck and vice versa).

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented.

What is claimed is:

1. A pitch motor trolley configured to remove or replace a pitch motor in a hub of a wind turbine, the pitch motor trolley comprising:
    a base structure configured to removably connect to a part within a nacelle or the hub of the wind turbine;
    a structure at one end integrated with or connected to the base structure;
    a track connected to an opposite end of the structure;
    a trolley configured to move along the track;
    a hoist connected to the trolley and configured to raise and lower the pitch motor;
    wherein the base structure is configured to connect with the part within the nacelle;
    wherein the nacelle includes a ceiling opening in its ceiling;
    wherein the hub includes a ceiling opening in its ceiling;
    wherein the structure, connected to the base structure, is configured to go through the ceiling opening in the nacelle;
    wherein the track is sized to span across at least a part of the ceiling opening in the nacelle and at least a part of the ceiling opening in the hub;
    wherein the trolley is configured to move along the track to be positioned exterior to the nacelle and above the ceiling opening in the nacelle and positioned exterior to the hub and above the ceiling opening in the hub;
    wherein the hoist is configured to move the pitch motor upward and downward when the trolley is positioned above the ceiling opening in the nacelle and when the trolley is positioned above the ceiling opening in the hub;
    wherein the nacelle includes a floor opening in its floor;
    wherein the wind turbine includes a yaw deck; and
    wherein the hoist is configured to move the pitch motor upward from the yaw deck through the floor opening in the floor of the nacelle and downward from the floor opening in the floor of the nacelle to the yaw deck.

2. The pitch motor trolley of claim 1, wherein, when the base structure is connected to the part within the nacelle, when the structure is connected to the base structure, and when the track is connected to the structure, a first part of the track is positioned above the ceiling opening in the nacelle and a second part of the track is positioned above the ceiling opening in the hub.

3. The pitch motor trolley of claim 2, wherein the base structure is configured to connect with a main bearing within the nacelle.

4. The pitch motor trolley of claim 3, wherein the structure comprises a telescoping structure.

5. The pitch motor trolley of claim 1, wherein the track is configured to be removably connected to the opposite end of the structure; and
    wherein the hoist is configured to be removably connected to the trolley.

6. The pitch motor trolley of claim 1, wherein the hoist comprises a motor configured to raise and lower the pitch motor.

7. The pitch motor trolley of claim 1, wherein the track comprises an I-beam;
    wherein the trolley includes wheels configured to engage the I-beam; and
    wherein the trolley includes a clasp configured to connect with the hoist.

8. The pitch motor trolley of claim 1, wherein the track includes a hole through which a pin is configured to be inserted; and
    wherein the pin is configured to restrict movement of the trolley along the track.

9. The pitch motor trolley of claim 1, further comprising a step connected to one or both of the base structure or the structure.

10. The pitch motor trolley of claim 9, wherein the structure comprises a telescoping structure; and
   wherein the step is configured to abut at least a part of the telescoping structure.

11. The pitch motor trolley of claim 1, wherein the base structure is configured to connect with a main bearing within the nacelle.

12. The pitch motor trolley of claim 1, wherein the pitch motor trolley is configured to raise or lower the pitch motor no more than 40 feet.

13. The pitch motor trolley of claim 1, wherein the pitch motor trolley is configured to raise or lower the pitch motor no more than 50 feet.

\* \* \* \* \*